United States Patent
DeLuca et al.

(10) Patent No.: US 10,922,739 B2
(45) Date of Patent: Feb. 16, 2021

(54) LISTING ITEMS FROM AN ECOMMERCE SITE BASED ON ONLINE FRIENDS WITH PRODUCT ASSOCIATION DESIGNATIONS

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/819,551

(22) Filed: Nov. 21, 2017

(65) Prior Publication Data

US 2019/0156397 A1    May 23, 2019

(51) Int. Cl.
*G06Q 30/00*    (2012.01)
*G06Q 30/06*    (2012.01)

(52) U.S. Cl.
CPC ................ *G06Q 30/0633* (2013.01)

(58) Field of Classification Search
CPC .............. G06Q 30/00; G06Q 30/0601; G06Q 30/0613; G06Q 30/0623; G06Q 30/0629; G06Q 30/0631
See application file for complete search history.

(56) References Cited

U.S. PATENT DOCUMENTS

| | | | |
|---|---|---|---|
| 8,386,336 B1* | 2/2013 | Fox ................... | G06Q 30/0631 705/26.7 |
| 9,230,278 B2 | 1/2016 | Cook et al. | |
| 9,253,325 B1* | 2/2016 | Smith ................. | H04M 3/5175 |
| 2001/0021914 A1* | 9/2001 | Jacobi ................ | G06Q 30/02 705/14.53 |
| 2009/0110089 A1* | 4/2009 | Green ................. | H04L 5/0037 375/260 |

(Continued)

OTHER PUBLICATIONS

Chu, Hsunchi, and Shuling Liao. "Defining and categorizing consumer resale behavior in consumer-to-consumer (C2C) E-commerce." International Journal of Business and Information 2.2 (2007). (Year: 2007).*

(Continued)

*Primary Examiner* — Christopher B Seibert
(74) *Attorney, Agent, or Firm* — Stephanie Carusillo; Maxine L. Barasch; Keohane & D'Alessandro, PLLC (57) ABSTRACT

Disclosed embodiments provide techniques for presenting a list of items from an ecommerce site sorted or ranked based on the availability of online contacts having product association designation for one or more of the items. A client device issues a query to an ecommerce site and retrieves a list of items. A social media system is queried to find online contacts belonging to the network of a user. The profile and/or metadata for each online contact is examined to determine if the contact has a product association designation for one or more of the items. The list of items is sorted and/or ranked based on the current availability of online friends having a product association, such that items that have at least one online product designation contact available are presented in the list first, before listing items that are not associated with an available online product association contact.

11 Claims, 8 Drawing Sheets

(56) References Cited

U.S. PATENT DOCUMENTS

| | | | | |
|---|---|---|---|---|
| 2010/0268661 | A1* | 10/2010 | Levy | G06Q 30/02 705/347 |
| 2011/0137995 | A1* | 6/2011 | Stewart | H04L 67/18 709/205 |
| 2013/0030950 | A1* | 1/2013 | Leng | G06Q 30/02 705/26.7 |
| 2014/0105508 | A1* | 4/2014 | Arora | G06K 9/72 382/218 |
| 2014/0195931 | A1* | 7/2014 | Kwon | G06Q 30/02 715/753 |
| 2015/0100454 | A1* | 4/2015 | Cook | G06Q 30/0631 705/26.7 |

OTHER PUBLICATIONS

Jolie O'Dell, Mashable, "Amazon + Facebook = A Perfect Storm of Recommendations", http://mashable.com/2010/07/27/amazon-facebook-recommendations/#z8jEGLfsRmqY, 21 pages.

Fay, Brad et al., "Recommendations are What Drives Your Business. Remember to Ask for Them.", https://www.forbes.com/sites/kellerfaygroup/2012/07/25/recommendations-are-what-drives-your-business-remember-to-ask-for-them/#4e971fec39c6, Jul. 25, 2012, 2 pgs.

\* cited by examiner

LISTING ITEMS FROM AN ECOMMERCE SITE BASED ON ONLINE FRIENDS WITH PRODUCT ASSOCIATION DESIGNATIONS

FIELD OF INVENTION

Embodiments relate to listing items from an ecommerce website based on online friends with product association designations.

BACKGROUND

When shopping online, the number of options from which a person can choose in terms of models, versions, manufacturers, and other variables can be overwhelming. It can be difficult for someone to select which particular item, of a plurality of options, to purchase. Online reviews are typically static, and do not allow a person to ask questions of the reviewer in near real time. If one or more of a person's friends have experience purchasing the type of product or a similar product in the past, the person may not be aware of that and miss the opportunity, prior to purchasing, to ask about the friend's experience. There exists a need for improvements in ecommerce and social networking.

SUMMARY

In one aspect, there is provided a computer-implemented method for presenting a representation of items, comprising: retrieving a plurality of items from an e-commerce system; retrieving a plurality of contacts from a social media system; identifying a subset of the plurality of contacts with a current online status that have a product association designation for at least one of the plurality of items; associating one or more of the plurality of items with at least one contact from the subset of the plurality of contacts; generating a ranked list of the plurality of items, wherein the associated items from the plurality of items are ranked highest in the ranked list; and rendering the ranked list of the plurality of items on an electronic display.

In another aspect, there is provided an electronic communication device comprising: a processor; a memory coupled to the processor, the memory containing instructions, that when executed by the processor, perform the steps of: retrieving a plurality of items from an ecommerce system; retrieving a plurality of contacts from a social media system; identifying a subset of the plurality of contacts with a current online status that have a product association designation for at least one of the plurality of items; associating one or more of the plurality of items with at least one contact from the subset of the plurality of contacts; generating a ranked list of the plurality of items, wherein the associated items from the plurality of items are ranked highest in the ranked list; and rendering the ranked list of the plurality of items on an electronic display.

In yet another aspect, there is provided a computer program product for presenting a representation of items, for an electronic computing device comprising a computer readable storage medium having program instructions embodied therewith, the program instructions executable by a processor to cause the electronic computing device to: retrieve a plurality of items from an e-commerce system; retrieve a plurality of contacts from a social media system; identify a subset of the plurality of contacts with a current online status that have a product association designation for at least one of the plurality of items; associate one or more of the plurality of items with at least one contact from the subset of the plurality of contacts; generate a ranked list of the plurality of items, wherein the associated items from the plurality of items are ranked highest in the list; and render the ranked list of the plurality of items on an electronic display.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for presenting a list of items from an ecommerce site sorted or ranked based on the availability of online contacts having product association designation for one or more of the items. In embodiments, the items may be items available for purchase, rent, or other transactional activity. In embodiments, a client device issues a query to an ecommerce site and retrieves a list of purchasable items. A social media system is queried to find online contacts belonging to the network of a user. The profile and/or metadata for each online contact is examined to determine if the contact has a product association designation for one or more of the purchasable items. The list of purchasable items is sorted and/or ranked based on the current availability of online friends having a product association, such that items that have at least one online product designation contact available are presented in the list first, before listing purchasable items that are not associated with an available online product association contact. In this way, the online shopping experience can be greatly enhanced.

Reference throughout this specification to "one embodiment," "an embodiment," "some embodiments", or similar language means that a particular feature, structure, or characteristic described in connection with the embodiment is included in at least one embodiment of the present invention.

Thus, appearances of the phrases in one embodiment, "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and or elements.

Figure 1:
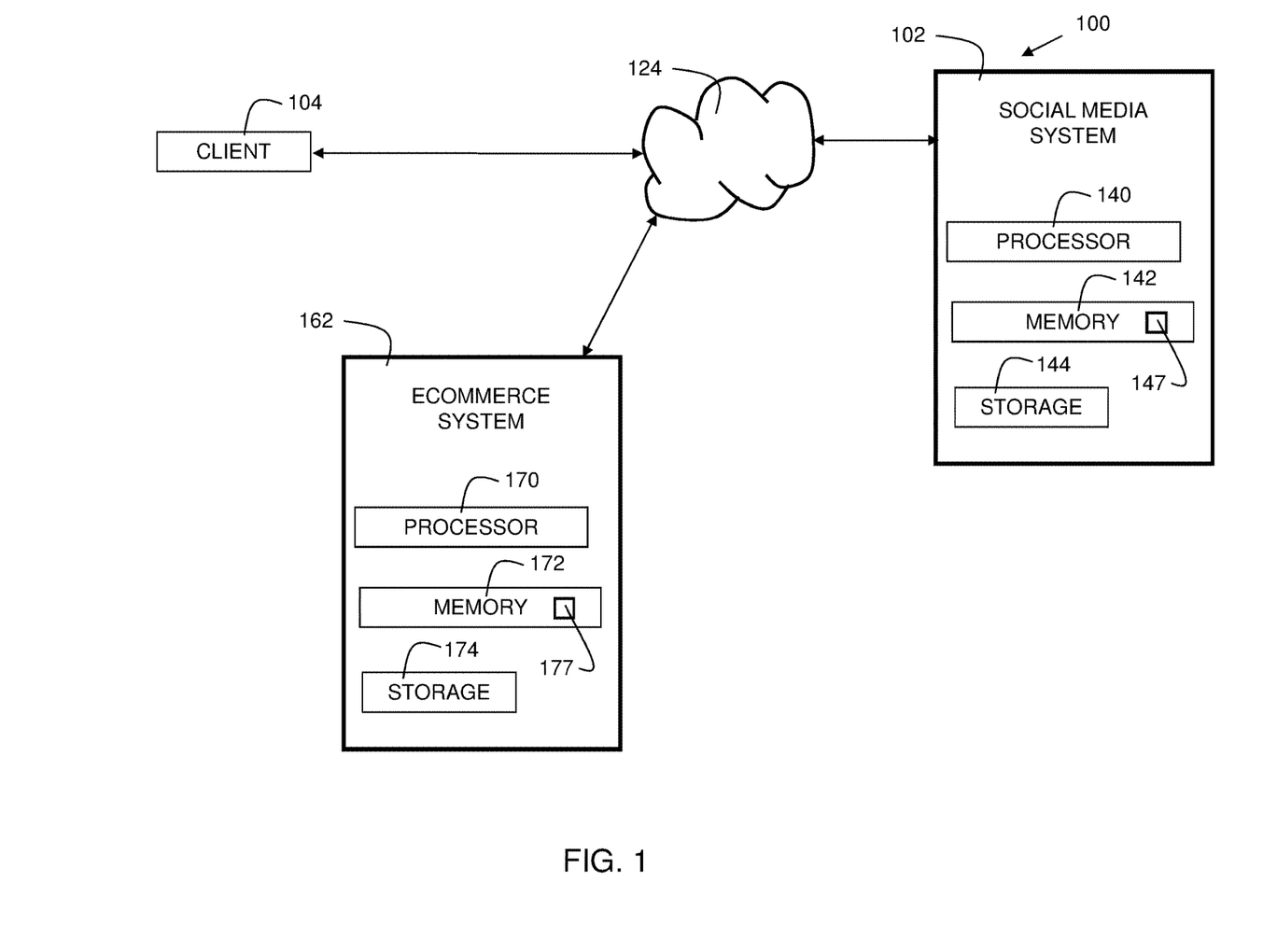
FIG. 1 is a block diagram illustrating an environment for embodiments of the present invention.

FIG. 1 is a block diagram 100 illustrating an environment for embodiments of the present invention. Social media system 102 comprises processor 140, memory 142, and storage 144. Instructions 147 for executing embodiments of the present invention are shown stored in memory 142. Social media system 102 is in communication with network 124. In embodiments, network 124 may be the Internet, a wide area network (WAN), a local area network (LAN), a cloud network, or any other suitable network. Ecommerce system 162 comprises a processor 170, memory 172, and storage 174. Instructions 177 for executing embodiments of the ecommerce system are shown stored in memory 172. Ecommerce system 162 is in communication with the network 124. Client device 104 is also in communication with network 124. The client device can be a smartphone, tablet computer, laptop computer, desktop computer, a combination thereof, or other suitable device.

Figure 2:
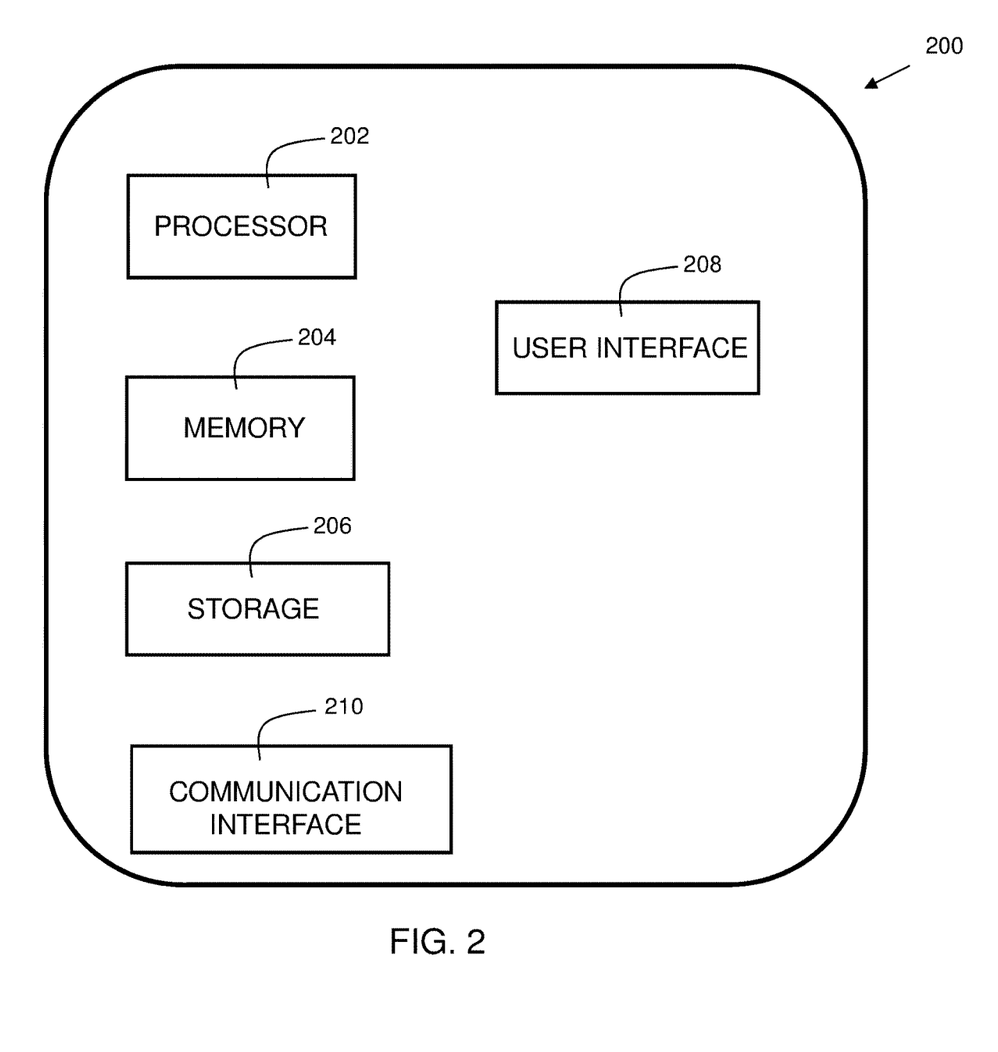
FIG. 2 is a block diagram of an example of a client device in accordance with embodiments of the present invention.

FIG. 2 is a block diagram of an example of a client device 200 in accordance with embodiments of the present invention. Device 200 is shown as a simplified diagram of modules. Device 200 is an electronic computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments.

The device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

Figure 3:
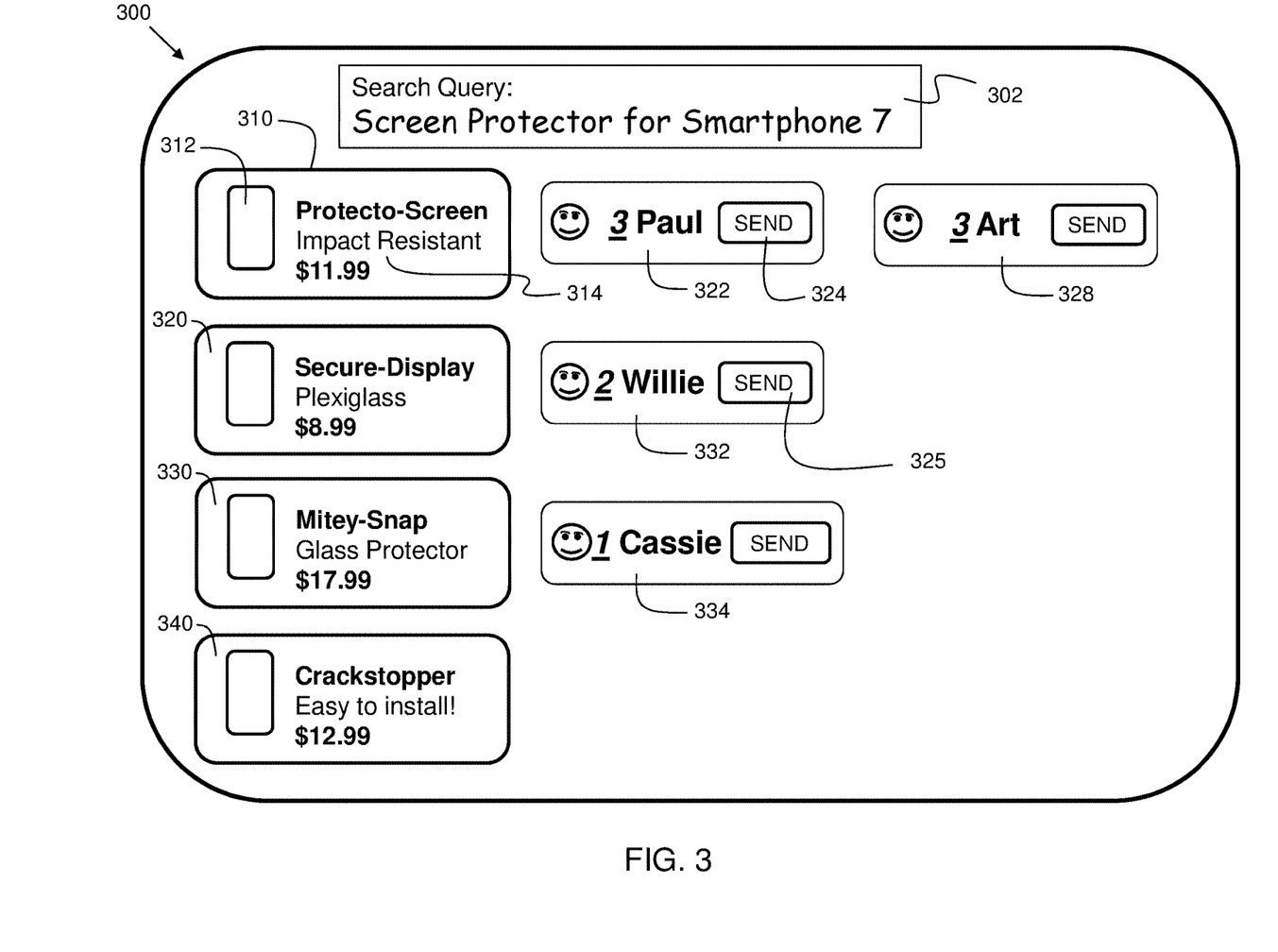
FIG. 3 is an exemplary rendering of a representation of purchasable items in accordance with embodiments of the present invention.

FIG. 3 is an exemplary rendering 300 of a representation of purchasable items in accordance with embodiments of the present invention. In embodiments, the representation can be an ordered list (ranked list). The list is ordered with items that have a current online contact with an associated product designation as being listed first within the list, before items that do not have a current online contact with an associated product designation. A user entered a search query in field 302: "Screen Protector for Smartphone 7". This causes a search of database stored in storage 174 of ecommerce system 162. The search may locate many entries that match the query. However, with embodiments of the present invention, items that have online contacts that have a product association designation are prioritized higher, and thus shown first in the search results. The product association designation can be one of expert, customer, employee, or other suitable designation that indicates some familiarity with the product. The rendering shows the following exemplary purchasable items: "Protecto-Screen" 310, "SecureDisplay" 320, "Mitey Snap" 330, and "Crackstopper" 340. Each item may include a graphical element such as an icon or photograph, and a corresponding text description. For example, item 310 includes graphical element 312 and text description 314. The text description can include a product name, features, price, and other associated information.

A set of online contacts are retrieved from the social media system 102. The set may include all of the online contacts in the social media system 102. Alternatively, it may include a plurality of contacts from a user-defined subgroup. For example, the subgroup could include contacts the user previously designated as a friend, family member, club member, or other suitable relationship.

A subset of the plurality of online contacts are identified that have a current online status that have a product association designation for at least one of the plurality of purchasable items. A product association designation indicates that a user of the social media system has some association with a particular product. The designation may include "expert." This may be determined based in an analysis of the user's blog post frequency, number of likes on tutorial videos posted by the user, etc. The designation could be based on the user's past purchase history. For example, the designation may include that the user previously purchased the same item. The designation may include that the user previously purchased an older or newer version of the same item. The designation may include that the user previously purchased a competitor item. The designation may include that the user previously purchased a similar item. These are examples, and any suitable designations are included within the scope of the present invention.

The system determines which of the plurality of purchasable items are associated with at least one contact from the subset of the plurality of contacts. A ranked list of the plurality of purchasable items is generated, wherein the associated items from the plurality of purchasable items are ranked highest in the list. The ranked list of the plurality of purchasable items is rendered on an electronic display, Options, for example buttons, are displayed with each entry on the list, such that the searching user can send a message to any of the online contacts. For example, button 324 is shown with Paul 322 such that the user can send Paul a message.

In the example, users, Paul 322 and Art 328, each have a current online status and have a product association designation for "Protecto-Screen" 312. Paul is designated as "expert" in phone case technologies, and Art recently purchased a Protecto-Screen. This provides each of Paul and Art a designation association value of "3". User Willie 332 has a current online status and a product association designation for "Secure-Display" 320. Willie previously purchased the Secure-Display product. This is a similar product to the queried product, providing an association designation value of 2. User Cassie 334 has a current online status and a product association designation for "Mitey Snap" 330. This is a competitor product to the queried product, providing an association designation of 1.

On the list of FIG. 3, the products are shown ranked. Protecto-Screen is ranked highest as the number of users multiplied by their association value is the highest at 6. Secure Display is second with one user multiplied by a designation value of "2" is 2. Mitey Snap is shown third with one user multiplied by an association value of 3. No contacts are online for Crackstopper 340, so it is ranked the lowest.

Rendering 300 herein is an example. In some embodiments, the rendering may have more or fewer elements. Any suitable configuration is included within the scope of the invention.

Figure 4:
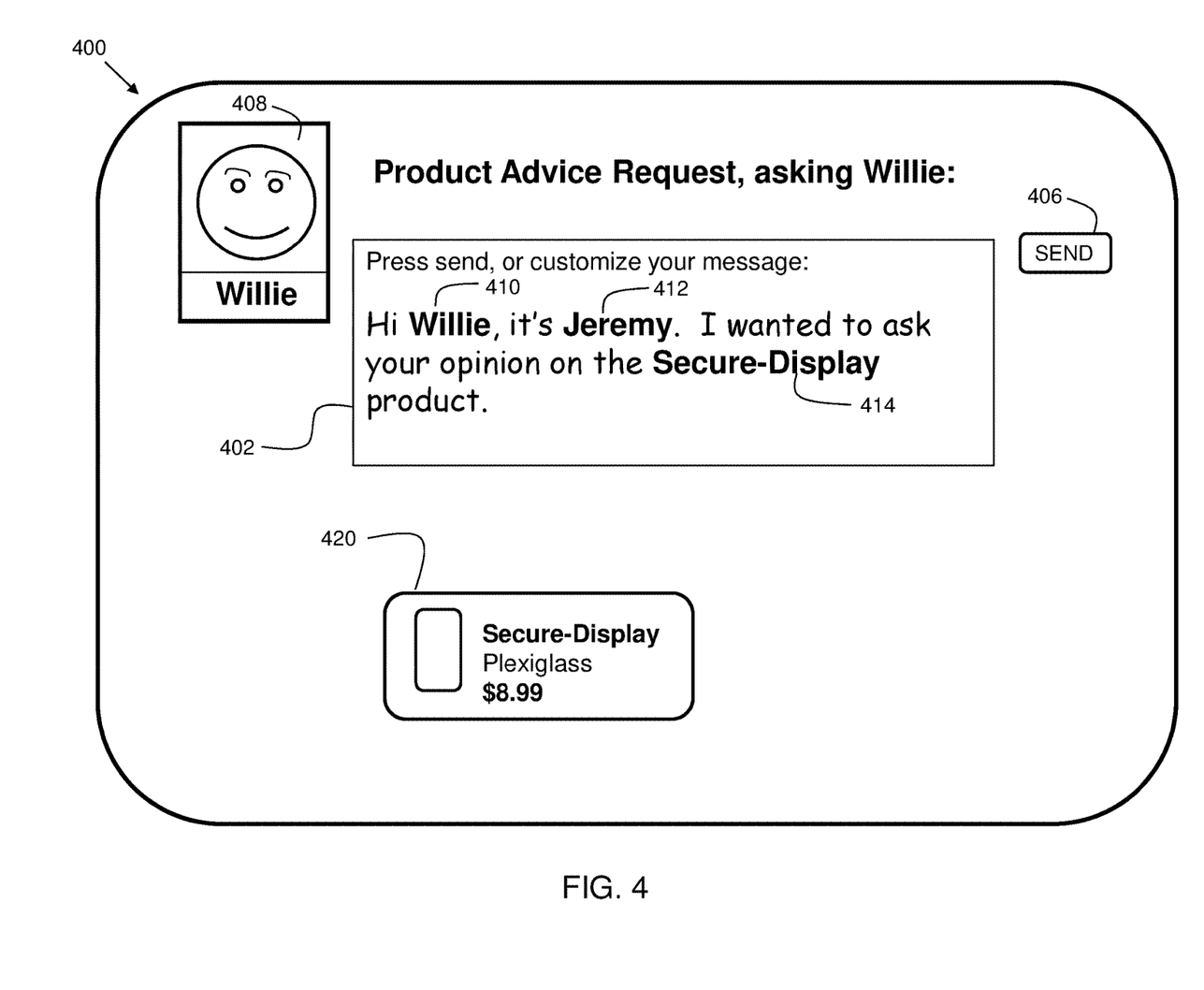
FIG. 4 is an exemplary product advice request form in accordance with embodiments of the present invention.

FIG. 4 is an exemplary product advice request form 400 in accordance with embodiments of the present invention. Embodiments can include providing a product advice request form for a user to contact at least one contact from the subset of the plurality of contacts with a current online status that have a product association designation for at least one of the plurality of purchasable items. This form is shown responsive to the user clicking send button 325 in FIG. 3. A field 402 is shown for entry of a question to the recipient user, here Willie. A send button 406 allows the user to transmit the query to the recipient user. The product to which the recipient user is associated is automatically populated and shown here: "Secure-Display" 420. A photo 408 of the recipient user may be shown.

In some embodiments, the request form further comprises populating a data field within the contact initiation control with a computer-generated introductory phrase. Field 402 may be automatically populated with information, for example, with the name of the sending user, the recipient user, and the product. In the example, the following message is populated: "Hi Willie, it's Jeremy. I wanted to ask your opinion on the Secure-Display product." Willie at 410 is the recipient user, and Jeremy 412 is the sending user. Secure-Display 414 is the name of the product. These items can be automatically populated with standard template text to create a product advice request as shown in FIG. 4. When Jeremy presses send button 406, the message is sent to Willie for review and reply. If Willie replies, he can answer Jeremy's questions about the Secure Display product.

Form 400 herein is an example. In some embodiments, the form may include more or fewer elements, Any suitable configuration is included within the scope of the invention.

Figure 5:
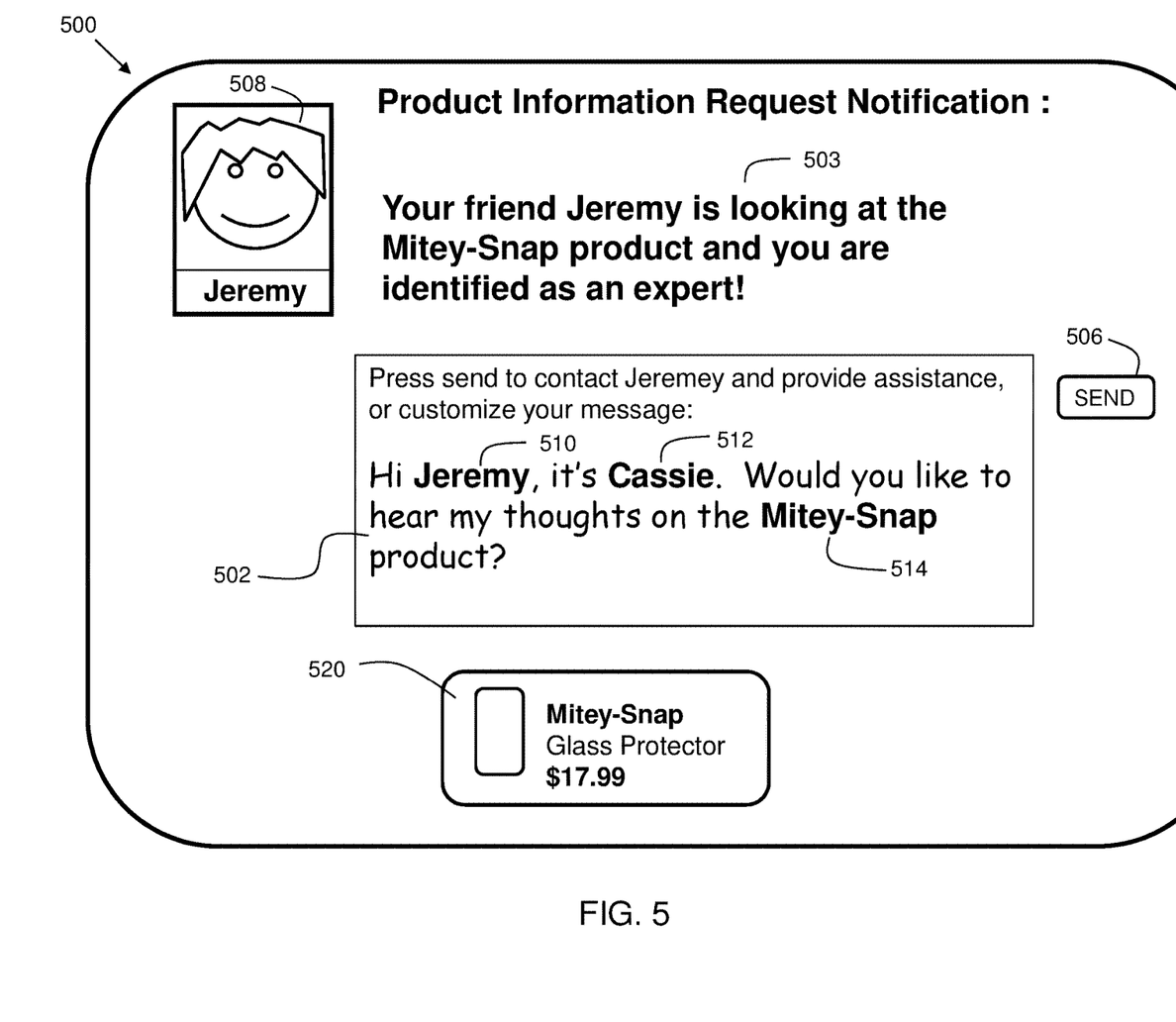
FIG. 5 is an exemplary automatic product information notification in accordance with embodiments of the present invention.

FIG. 5 is an exemplary automatic product information request notification 500 in accordance with embodiments of the present invention. Embodiments can include sending a product information request notification to at least one contact from the subset of the plurality of contacts with a current online status that have a product association designation for at least one of the plurality of purchasable items. The notification may indicate to a contact of a user that the user is looking at a product for which the user is identified as a designated expert, at 503, The product may be shown, here: "Mitey-Snap" 520. A photo 508 of the searching user may be shown. A field 502 is shown for entry of a question to the searching user, here Jeremy. A send button 506 allows the user to transmit the query to the searching user.

In some embodiments, the product information request notification further comprises sending a computer-generated introductory phrase. In some embodiments, the question in field 502 is automatically populated, for example, with the name of the sending user, the recipient user, and the product. In the example, the following message is populated: "Hi Jeremy, it's Cassie. Would you like to hear my thoughts on the Mitey-Snap product?" Cassie at 512 is the sending user, and Jeremy 510 is the recipient user. Mitey-Snap 514 is the name of the product. These items can be automatically populated with standard text to create a question as shown in FIG. 5. When Cassie presses send button 506, the message is sent to Jeremy for review and reply. If Jeremy replies, Cassie can answer Jeremy's questions about the Mitey-Snap product.

Notification 500 herein is an example. In some embodiments, more or fewer elements may be included on the notification. Any suitable configuration is included within the scope of the invention.

Figure 6:
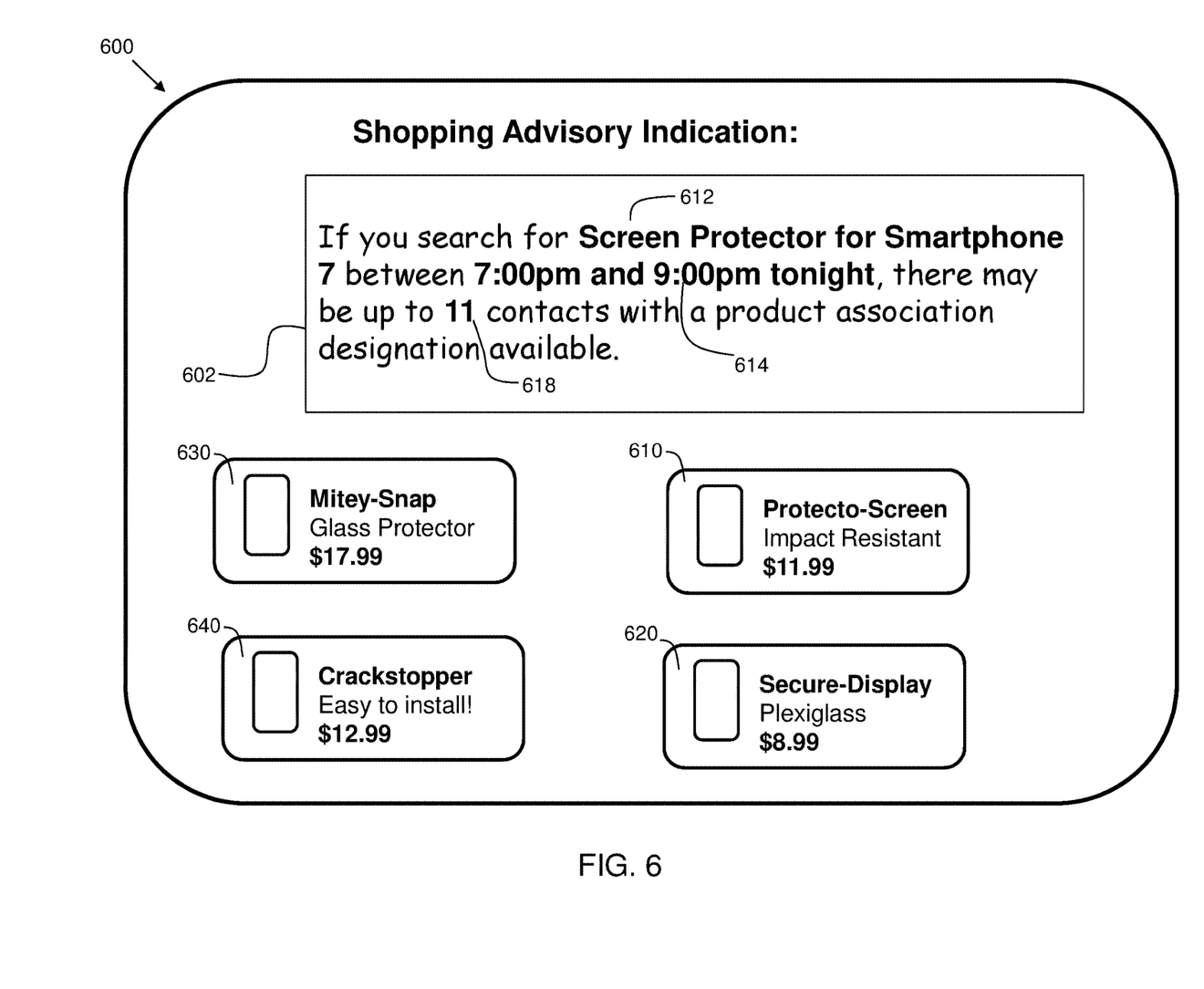
FIG. 6 is an exemplary shopping advisory indication in accordance with embodiments of the present invention.

FIG. 6 is an exemplary shopping advisory indication 600 in accordance with embodiments of the present invention. Embodiments can include determining a peak product association contact availability time range, and providing a shopping advisory indication to a user that includes the peak product association contact availability time range. Window 602 shows a message to a user. In the example, the message says, "If you search for Screen Protector for Smartphone 7 between 7:00 pm and 9:00 pm tonight, there may be up to 11 contacts with a product association designation available." This message may be standard frame language with fields populated, such as product query 612, timing 614, and number of contacts available at 618 (11 contacts in the example shown). The products that match the query can be shown, on the indication 600, for example at 610, 620, 630, and 640. This notification may indicate to the searching user the products matching the query as well as the optimal time for obtaining information from contacts with product association designations for those products. The peak product association contact availability may be determined based on an average of the time periods the users were online over the past three months. The time periods with the most of the users online on average over that period are the time periods suggested as the peak. Thus embodiments can include providing a peak product association designation availability time range and a shopping advisory indication to a user that includes the peak product association designation availability time range.

Indication 600 herein is an example. In some embodiments, more or fewer elements may be included on the indication. Any suitable configuration is included within the scope of the invention.

Figure 7:
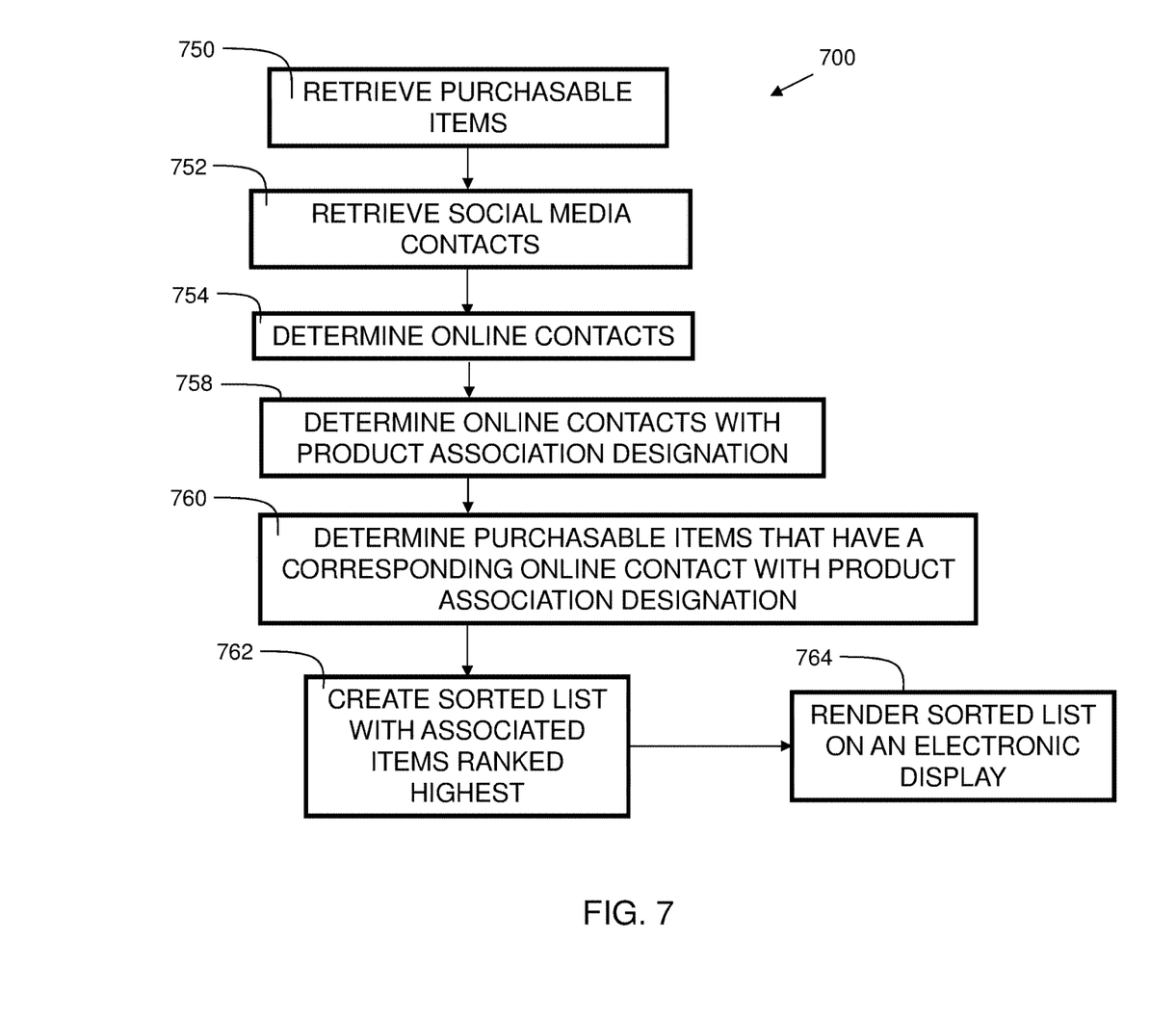
FIG. 7 is a flowchart indicating process steps for embodiments of the present invention.

FIG. 7 is a flowchart 700 indicating process steps for embodiments of the present invention. At 750, a plurality of purchasable items are retrieved from an ecommerce system. At 752, a plurality of contacts are retrieved from a social media system. At 754, a plurality of online contacts are determined. At 758, a subset of the plurality of online contacts are identified that have a current online status that have a product association designation for at least one of the plurality of purchasable items. At 760, it is determined which of the plurality of purchasable items is associated with at least one contact from the subset of the plurality of contacts. At 762, a ranked list of the plurality of purchasable items is generated, wherein the associated items from the plurality of purchasable items are ranked highest in the list. At 764, the ranked list of the plurality of purchasable items is rendered on an electronic display. In some embodiments, more or fewer elements may be included within the process, or the elements may be performed in a different order. All suitable configurations are included within the scope of the invention.

Figure 8:
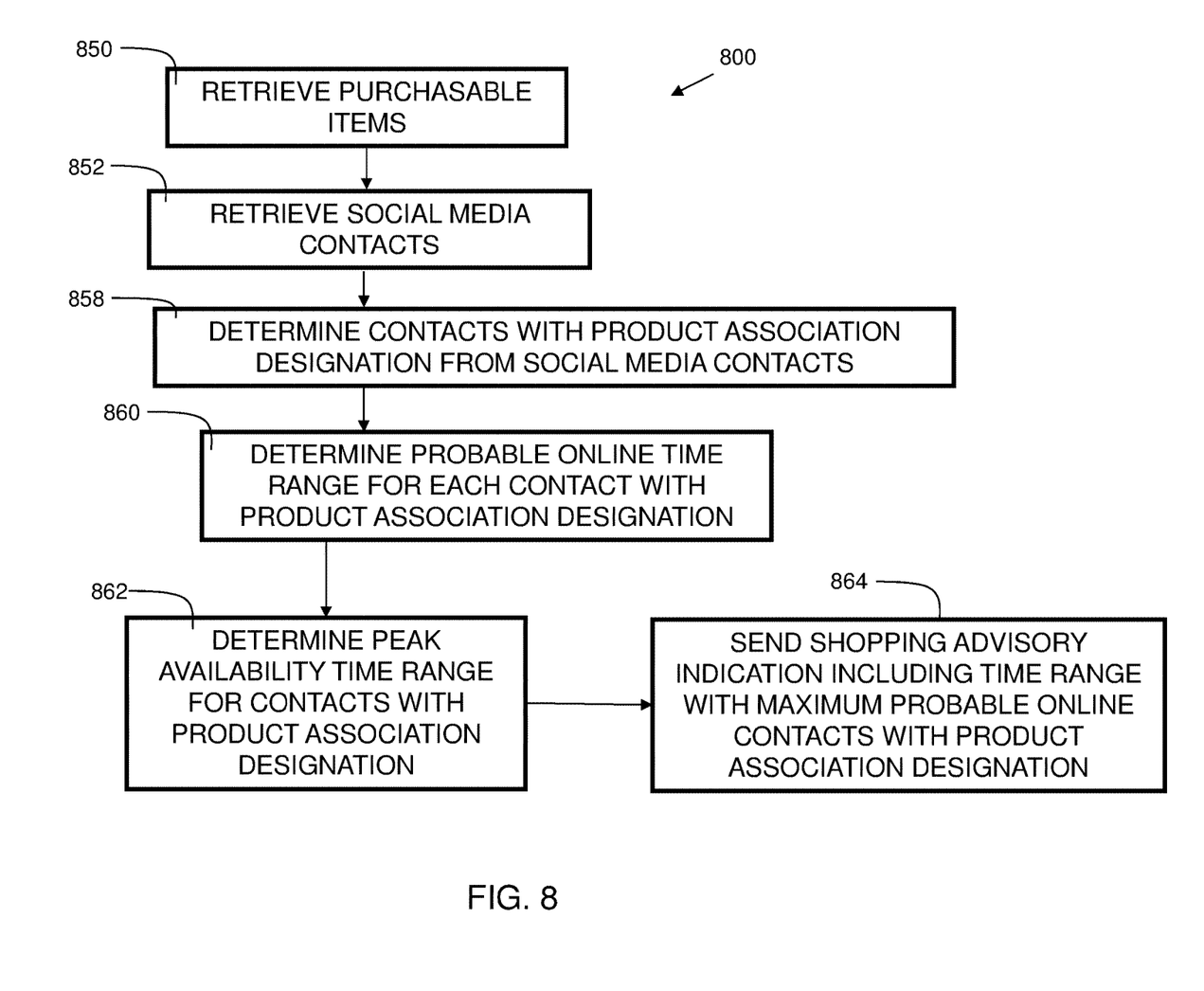
FIG. 8 is a flowchart indicating process steps for additional embodiments of the present invention.

FIG. 8 is a flowchart indicating process steps for additional embodiments of the present invention. At 850, purchasable items are retrieved. At 852, social media contacts are retrieved. At 858, contacts with product association designations are identified from social media contacts. At 860, a probable online time range for each contact with a product association designation is determined. At 862, peak availability time range for contacts with product association designation is determined. At 864, a shopping advisory indication is sent that includes the time range with maximum probable online contacts with product association designation.

In embodiments, this feature may be activated by the user performing an opt-in action, allowing the ecommerce system and/or social media system to solicit or encourage recommendations from a social network of a user. In embodiments, a user may be able to opt out, or otherwise disable this feature. In embodiments, the user may be able to disable the feature on a contact basis, in which case the user opts to not receive recommendations from one or more contacts. In some embodiments, the user may be able to disable the feature on a category basis, in which case the user opts to not receive recommendations from one or more product categories.

In some embodiments, more or fewer elements may be included within the process, or the elements may be performed in a different order. All suitable configurations are included within the scope of the invention.

As can now be appreciated, disclosed embodiments provide techniques for presenting a list of purchasable items from an ecommerce site sorted or ranked based on the availability of online contacts having experience with one or more of the purchasable items. This can help guide consumers through the various choices available when shopping online, thereby enhancing the overall consumer experience.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for presenting a representation of items, comprising:

providing an electronic system in communication, over a network, with an ecommerce system and a social media system;

retrieving, by the electronic system, a plurality of items from the ecommerce system, wherein the ecommerce system includes a processor and a memory;

retrieving, by the electronic system, a plurality of contacts from the social media system, wherein the social media system includes a processor and a memory;

identifying, by the electronic system, a subset of the plurality of contacts with a current online status, on the social media system, that have a product association designation for at least one of the plurality of items;

associating, by the electronic system, one or more of the plurality of items with at least one contact from the subset of the plurality of contacts;

generating, by the electronic system, a ranked list of the plurality of items, wherein the associated items from the plurality of items are ranked highest in the ranked list;

rendering, by the electronic system, a webpage showing the ranked list of the plurality of items on an electronic display, wherein the webpage further includes a button from which a user can send a message to a contact associated with a respective item, wherein data fields within the message are automatically populated with a computer-generated introductory phrase, a name of the user, a name of the contact, an identification of the product, and a send button for sending to the contact;

determining, by the electronic system, on at least one server, a peak product association contact availability time range based on an average of prior time periods, during a predetermined range, that users having the product association designation have been online;

providing, by the electronic system, a shopping advisory indication to a user that includes the peak product association contact availability time range; and providing the contact with an automated message, wherein data fields within the message are automatically populated with a computer-generated introductory phrase, the name of the contact, the name of the user, the identification of the product, and a send button for sending the message to the user.

2. The method of claim 1, wherein the retrieving a plurality of contacts from the social media system comprises retrieving, by the electronic system, a plurality of contacts from a user-defined subgroup.

3. The method of claim 1, further comprising sending, by the electronic system, a product information request notification to at least one contact from the subset of the plurality of contacts with a current online status that have a product association designation for at least one of the plurality of items.

4. The method of claim 3, wherein sending a product information request notification further comprises sending, by the electronic system, a computer-generated introductory phrase.

5. An electronic communication device comprising:
a processor;
a memory coupled to the processor, the memory containing instructions, that when executed by the processor, perform the steps of:
retrieving a plurality of items from an ecommerce system in communication with the electronic communication device, wherein the ecommerce system includes a processor and a memory;

retrieving a plurality of contacts from a social media system in communication with the electronic communication device, wherein the social media system includes a processor and a memory;

identifying a subset of the plurality of contacts with a current online status, on the social media system, that have a product association designation for at least one of the plurality of items;

associating one or more of the plurality of items with at least one contact from the subset of the plurality of contacts;

generating a ranked list of the plurality of items, wherein the associated items from the plurality of items are ranked highest in the ranked list;

rendering a webpage showing the ranked list of the plurality of items on an electronic display, wherein the webpage further includes a button from which a user can send a message to a contact associated with a respective item, wherein data fields within the message are automatically populated with a computer-generated introductory phrase, a name of the user, a name of the contact, an identification of the product, and a send button for sending to the contact;

determining a peak product association contact availability time range based on an average of prior time periods, during a predetermined range, that users having the product association designation have been online;

providing a shopping advisory indication to a user that includes the peak product association contact availability time range; and providing the contact with an automated message, wherein data fields within the message are automatically populated with a computer-generated introductory phrase, the name of the contact, the name of the user, the identification of the product, and a send button for sending the message to the user.

6. The device of claim 5, wherein the memory further comprises instructions, that when executed by the processor, perform the step of retrieving a plurality of contacts from a user-defined subgroup.

7. The device of claim 5, wherein the memory further comprises instructions, that when executed by the processor, perform the step of sending a product information request notification to at least one contact from the subset of the plurality of contacts with a current online status that have a product association designation for at least one of the plurality of items.

8. The device of claim 7, wherein the memory further comprises instructions, that when executed by the processor, perform the step of sending a computer-generated introductory phrase.

9. A computer program product for presenting a representation of items, for an electronic computing device comprising a computer readable storage medium having program instructions embodied therewith, the program instructions executable by a processor to cause the electronic computing device to:

retrieve a plurality of items from an ecommerce system in communication with the electronic computing device, wherein the ecommerce system includes a processor and a memory;

retrieve a plurality of contacts from a social media system in communication with the electronic computing device, wherein the social media system includes a processor and a memory;

identify a subset of the plurality of contacts with a current online status, on the social media system, that have a product association designation for at least one of the plurality of items;

associate one or more of the plurality of items with at least one contact from the subset of the plurality of contacts;

generate a ranked list of the plurality of items, wherein the associated items from the plurality of items are ranked highest in the list;

render a webpage showing the ranked list of the plurality of items on an electronic display, wherein the webpage further includes a button from which a user can send a message to a contact associated with a respective item, wherein data fields within the message are automatically populated with a computer-generated introductory phrase, a name of the user, a name of the contact, an identification of the product, and a send button for sending to the contact;

determine a peak product association contact availability time range based on an average of prior time periods, during a predetermined range, that users having the product association designation have been online;

provide a shopping advisory indication to a user that includes the peak product association contact availability time range; and provide the contact with an automated message, wherein data fields within the message are automatically populated with a computer-generated introductory phrase, the name of the contact, the name of the user, the identification of the product, and a send button for sending the message to the user.

10. The computer program product of claim 9, further comprising program instructions executable by a processor to cause the electronic computing device to retrieve a plurality of contacts from a user-defined subgroup.

11. The computer program product of claim 9, further comprising program instructions executable by a processor to cause the electronic computing device to send a product information request notification to at least one contact from the subset of the plurality of contacts with a current online status that have a product association designation for at least one of the plurality of items.

* * * * *